(12) United States Patent
Wegner et al.

(10) Patent No.: US 7,654,508 B2
(45) Date of Patent: Feb. 2, 2010

(54) AIR HUMIDIFIER

(75) Inventors: Guido Wegner, Schlier (DE); Alfred Hitzler, Mochenwangen (DE)

(73) Assignee: Venta-Luftwascher GmbH, Weingarten (DE)

( * ) Notice: Subject to any disclaimer, the term of this patent is extended or adjusted under 35 U.S.C. 154(b) by 0 days.

(21) Appl. No.: 12/357,650

(22) Filed: Jan. 22, 2009

(65) Prior Publication Data

US 2009/0174088 A1   Jul. 9, 2009

Related U.S. Application Data

(63) Continuation of application No. PCT/DE2007/000963, filed on May 29, 2007.

(30) Foreign Application Priority Data

Jul. 26, 2006  (DE) .................. 10 2006 035 214

(51) Int. Cl.
   *B01F 3/04*   (2006.01)
(52) U.S. Cl. .................. 261/34.1; 261/78.2; 261/81; 261/DIG. 46; 261/DIG. 48; 210/259; 210/295
(58) Field of Classification Search .................. 261/28, 261/30, 34.1, 72.1, 78.2, 81, 116, 119.1, 261/DIG. 46, DIG. 48, DIG. 65, DIG. 80; 210/252, 259, 295, 748
See application file for complete search history.

(56) References Cited

U.S. PATENT DOCUMENTS

| 4,087,495 | A | * | 5/1978 | Umehara ................ 261/81 |
| 4,089,915 | A | * | 5/1978 | Jackson ................ 261/39.1 |
| 4,257,989 | A | | 3/1981 | Nishikawa |
| 4,643,351 | A | | 2/1987 | Fukamachi et al. |
| 4,663,091 | A | | 5/1987 | Seo |
| 4,708,826 | A | * | 11/1987 | Mizoguchi ................ 261/30 |
| 5,354,515 | A | | 10/1994 | Ushimaru |
| 5,916,490 | A | * | 6/1999 | Cho ................ 261/72.1 |
| 7,540,474 | B1 | * | 6/2009 | Huang et al. ................ 261/81 |

FOREIGN PATENT DOCUMENTS

| CH | 400 498 A1 | 4/1966 |
| DE | 30 25 183 A1 | 1/1981 |
| DE | 35 07 544 A1 | 9/1986 |
| DE | 41 22 389 A1 | 1/1993 |
| JP | 01-196435 A1 | 8/1989 |
| JP | 10-281502 A1 | 10/1998 |
| JP | 2001-082774 A1 | 3/2001 |

* cited by examiner

*Primary Examiner*—Scott Bushey
(74) *Attorney, Agent, or Firm*—Burr & Brown

(57) ABSTRACT

An air humidifier including a first container and a second container that can be filled with water from the first container, an atomizer and electrodes. The second container is subdivided into a first reservoir and a second reservoir, the two reservoirs being interconnected with the interposition of a filter. Two electrodes are arranged in the first reservoir, and a component of the atomizer is arranged in the second reservoir in order to atomize the water.

18 Claims, 5 Drawing Sheets

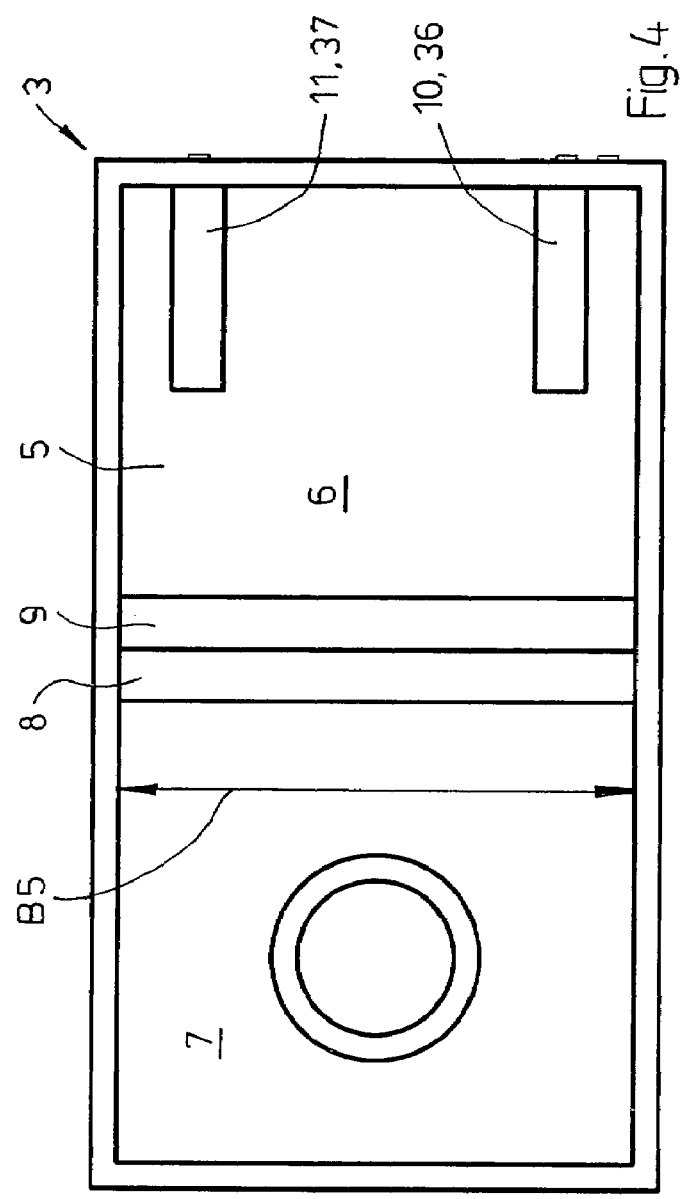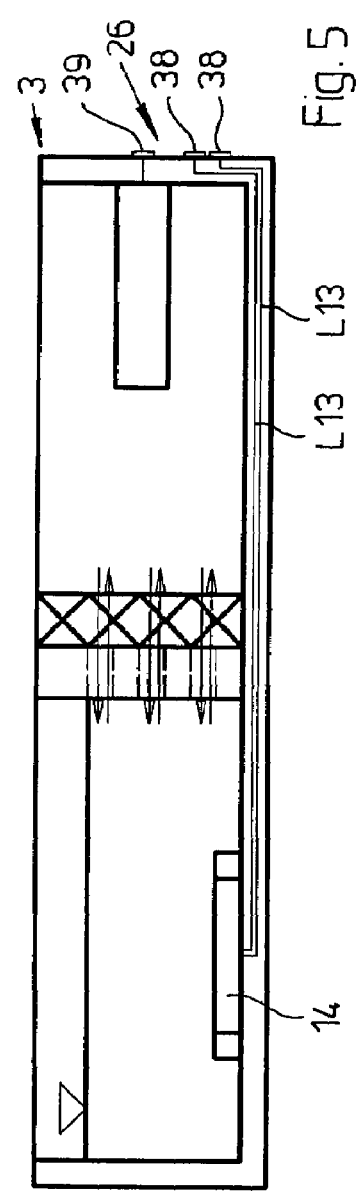

AIR HUMIDIFIER

CROSS REFERENCE TO RELATED APPLICATIONS

This application is a continuation of International Application No. PCT/DE2007/000963, filed May 29, 2007, which designated the United States, and claims the benefit under 35 USC §119(a)-(d) of German Application No. 10 2006 035 214.9 filed Jul. 26, 2006, the entireties of which are incorporated herein by reference.

FIELD OF THE INVENTION

The invention relates to an air humidifier.

BACKGROUND OF THE INVENTION

Atomizers have long been in use for air humidification, in particular of interior spaces. Such atomizers make use of ultrasound or fine nozzles in order to generate a cold fog composed of tiny droplets. The known atomizers have the following disadvantages in principle. Lime that is dissolved in the water being used is atomized along with the water and perceived later in the environment as undesired fine lime precipitation. Furthermore, in the case of air humidifiers with two containers that are flowed through in series, there is a risk of germs building up at high temperatures and/or during standstill times. This, too, is also not effectively countered by measures that are taken in the first container against the build up of germs. Thus, particularly given long standstill times, germs form in the second, downstream container and are then immediately atomized as well when the air humidifier is switched on. Finally, the lime dissolved in the water leads not only to the described lime deposits in the environment of the air humidifier, but also impairs the service life and/or functioning of the oscillating plate used in the case of ultrasonic atomization, or of the nozzle used in the case of nozzle atomization. The functioning of the oscillating plate is impaired by lime deposits, in particular. These lime deposits can be removed by a cleaning process that takes place every three to four days. However, in the case of mechanical cleaning there is the risk of damaging the oscillating plate. The atomizing function of the nozzle is influenced, in particular, by an increasing obstruction due to lime deposits. In the known apparatuses, use is made of deliming cartridges in order to reduce these liming problems. However, said cartridges must be frequently changed and, in accordance with new findings, form an optimum feeding ground for bacteria and fungi owing to the large surface of the granulate used.

JP 10-281502 A1 discloses an air humidifier that comprises a first container and a second container that can be filled from the first container, an atomizer and electrodes arranged in the first container. This air humidifier has the above-described problems associated with the lime and the hygiene in the second container.

SUMMARY OF THE INVENTION

It is the object of the invention to develop an air humidifier whose function and service life is not impaired by lime dissolved in the water during operation lasting at least a few months, and which can be operated acceptably from a hygienic point of view even after lengthy standstill times or at relatively high ambient temperatures.

The inventive air humidifier has a second container that is subdivided into a first reservoir and a second reservoir, the two reservoirs being connected with the interposition of a filter, two electrodes being arranged in the first reservoir, and a component of the atomizer being arranged in the second reservoir in order to atomize the water. The electrodes in the second container thereby perform deliming and sterilization, precipitated lime particles being kept away by the filter from the component of the atomizer, that is to say the oscillating plate or the nozzle. The essence of the invention is therefore a water treatment in the second container, the water treatment permitting the displacement of the water treatment from the first container into the second container owing to the separation of the second container with a filter into a treatment reservoir and an atomization reservoir.

Furthermore, the invention provides for separating the air humidifier physically into a base unit and at least one replaceable module. This enables a simple replacement of wearing parts, the technology used enabling a long service life of the wearing parts, and thus long service intervals.

The invention provides for the electrodes and/or the filter and/or the component of the atomizer for atomizing water to be integrated in the replaceable module. This ensures a long service life of the base unit.

The invention also provides that the module can be inserted into the base unit and be removed from the base unit. It is thereby possible to replace the module easily.

According to the invention, the module comprises the second container. This further simplifies the replacement, since it is possible to design a compact and stable assembly in which the second container takes over the function of a carrier for the further components.

The invention also provides to design the electrodes as ceramic electrodes. Such electrodes permit a so-called electrolytic sterilization of the water.

The invention provides to design the filter as a mechanical filter. Such a mechanical filter can be used to filter out coarse contaminants and lime particles, a mechanical filter also enabling the water to consequently flow rapidly from the first reservoir of the second container into the second reservoir of the second container.

The invention also provides to equip the second container with at least one sensor and to design the latter, in particular, as a component of the module. A sensor enables the operational safety of the air humidifier to be enhanced and—if the sensor is a component of the module—to ensure its acceptable operation even over years.

The invention provides, in particular, for the sensor to be used to monitor the water level in the second container. This enables the atomizer to be protected against detrimental dry operation.

According to the invention, such a sensor can be formed by the two electrodes. Such a sensor is particularly cost effective, since it is implemented by existing components and all that is required is an electronic evaluation of determined characteristic data.

The invention also provides for the sensor to be used to acquire the quality of the water in the second container. This enables a warning function to be implemented that warns the user against operation that damages health when, for example, a liquid other than water is filled in.

The invention further provides an electrical interface with a control electronics on the module. This enables the module to be handled easily when being installed in and removed from the base unit of the air humidifier.

In accordance with a design variant, the invention provides to design the atomizer as an ultrasonic atomizer, the ultrasonic atomizer comprising an electronic system and an oscillating plate that are physically separated from one another, and the oscillating plate being arranged in the second reservoir as a component of the atomizer. This separation of the oscillating plate from its electronic system avoids additional heating of the water in the second container or the second reservoir of the second container, and thus additionally avoids deposition of residual lime present on the oscillating plate.

The invention provides to design the oscillating plate as a piezoceramic plate. Piezoceramic plates enable a particularly fine atomization.

The invention also provides to equip the interface of the module with electrical contacts for the oscillating plate. It is thereby possible to lead the connection between the oscillating plate and its electronic system via the interface, and the oscillating plate and associated power electronics can easily be separated.

In accordance with a further design variant, the invention provides to design the atomizer as a nozzle atomizer, the nozzle atomizer comprising a pump and a nozzle, the nozzle being arranged in the second reservoir as a component of the atomizer. Particularly powerful air humidifiers can be built with such an atomizer.

Finally, the invention provides for the electrodes arranged in the second container also to be operated in a standby mode in which the atomizer is not active. It is thereby possible for water that is located in the first and in the second reservoir to be kept in a hygienically acceptable state during a pause in operation of the air humidifier. It is thereby also ensured that no infected fog is produced after the pause in operation.

An air humidifier is to be understood within the meaning of the invention as an apparatus that uses an atomizer to atomize water into tiny drops and outputs this cold fog to the environment.

BRIEF DESCRIPTION OF THE DRAWINGS

Further details of the invention are described in the drawing with the aid of schematically illustrated exemplary embodiments.

FIG. 4 shows a plan view of the replaceable module;

FIG. 5 shows a side view of the replaceable module; and

DETAILED DESCRIPTION OF THE INVENTION

Figure 1:
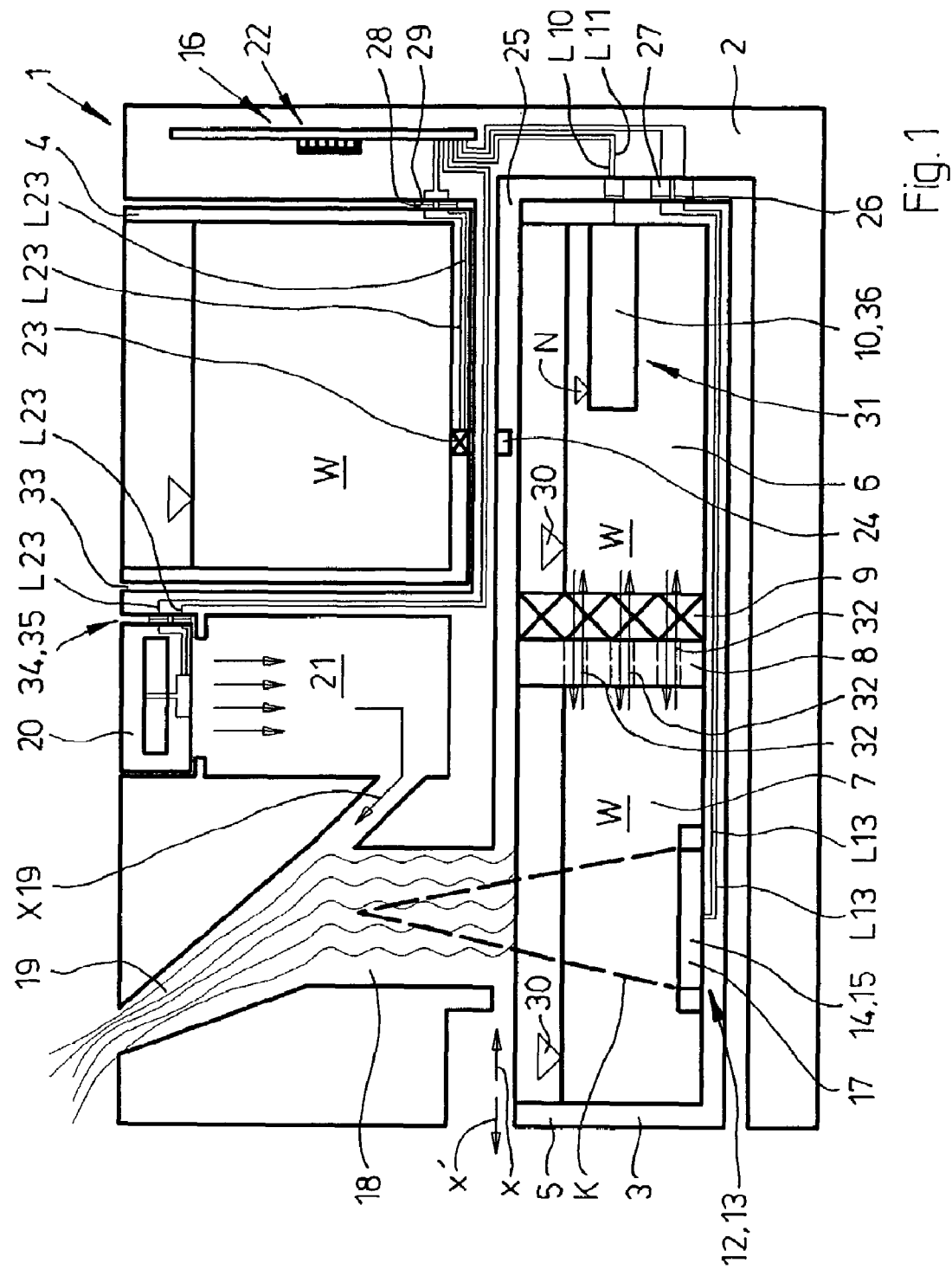
FIG. 1 shows a schematic side view of an air humidifier according to the invention.

An air humidifier 1 according to the invention is illustrated in a schematic side view in FIG. 1. The air humidifier 1 essentially comprises a base unit 2 and a replaceable module 3. The air humidifier 1 comprises a first container 4, which can be removed, and a second container 5 that is constructed in the replaceable module 3. The second container 5 is subdivided into a first reservoir 6 and a second reservoir 7. A partition 8 dividing the second container 5 comprises a filter 9. Arranged in the first reservoir 6 of the second container 5 are two electrodes 10, 11 (see also FIG. 4), by means of which water W that is located in the second container 5 can be delimed and disinfected. The air humidifier 1 further comprises an atomizer 12. The atomizer 12 is designed as an ultrasonic atomizer 13 and essentially comprises an oscillating plate 14 that is designed as a piezoceramic plate 15 and is connected to an electronic system 16 via lines L13. The oscillating plate 14 forms a component 17 of the atomizer 12 or 13 that is arranged in the second reservoir 7 of the second container 5 and thus belongs to the replaceable module 3. When the ultrasonic atomizer 13 is operating, there is formed via the oscillating plate 14 a water cone K that reaches into an outflow duct 18. Very small water droplets (not illustrated in detail) are entrained along the outflow duct 18 by an air flow 19, the air flow 19 being generated by a fan 20 and flowing into the outflow duct 18 via a blower duct 21 in an arrow direction X19. Finally, the air humidifier 1 comprises a control electronics 22 by means of which the air humidifier 1 can be controlled in an automated fashion. For example, the control electronics 22 of the air humidifier 1 is used to control a valve 23 assigned to the first container 4. The valve 23 is seated in an outlet 24 of the first container 4, via which the second container 5 or the first reservoir 6 thereof can be filled. For the purpose of holding the replaceable module 3, the air humidifier 1 has an insertion shaft 25 from which the replaceable module 3 can be withdrawn in an arrow direction x' and can be pushed in an arrow direction x. In order to make contact between the replaceable module 3 and the housing 2, the replaceable module 3 and the housing 2 respectively have an electrical interface 26 or 27, respectively, via which the two components 2 and 3 can make contact with one another in the position of the module 3 that is pushed in, as illustrated in FIG. 1. In addition to the above-mentioned lines L13 that connect the oscillating plate 14 to its electronic system 16, lines L10 and L11, via which the electrodes 10, 11 are connected to the control electronics 22, are also guided via the interfaces 26, 27. Also arranged on the first container 4 is an interface 28 via which said container is connected to a further interface 29 of the base unit 2. Guided via these interfaces 28, 29 are lines L23 that connect the valve 23 to the control electronics 22. The valve 23 is opened or closed by the control electronics 22 as a function of a water level 30 exhibited by the second container 5 in its two reservoirs 6, 7. In order to implement this refilling function, the second container 5 has a sensor 31 that is formed by the two electrodes 10, 11. A lowering of the water level 30 below a level N can be detected by the electrodes 10, 11 forming the sensor 31. In accordance with a design variant that is not illustrated, it is also provided to control the refilling operation purely mechanically and to design it in accordance with the so-called bird-bath principle.

The air humidifier 1 can be completely maintained by a minimum of outlay without technical knowledge by replacing the replaceable module 3 for an equivalent, new replaceable module. In this case, the electrodes 10, 11, the filter 9 and the oscillating plate 14 are changed by replacing the module 3. Consequently, all the components of the air humidifier 1 that are subject to wear can be replaced with the module 3. Since, apart from a natural vaporization owing to the ambient heat, water is consumed only in the second reservoir 7, the water W flows through the filter 9 and ducts 32 in the partition 8 during operation of the atomizer 12, generally in the arrow direction x'. In a so-called standby mode, in which the atomizer 12 is not active, it is, however, also possible for the water W to flow back in the arrow direction x through the ducts 32 in the partition 8 and the filter 9. To this extent, the two reservoirs 6 and 7 constitute two communicating vessels. Consequently, a disinfecting action of the electrodes 10, 11 that are being operated further in the standby mode also affects the quality of the water W in the second reservoir 7. The electrodes 10, 11 thereby keep the second container 5 in a hygienically acceptable state in the standby mode of the air humidifier 1. The first container 4 can also be removed from a shaft 33 of the air humidifier 1 or the base unit 2 in order to be filled up and cleaned. Finally, it is provided to guide lines L23 that connect the fan 23 to the control electronics 22 via cooperating interfaces 34 and 35. The interface 34 is constructed on the fan 23 thereby, and the interface 35 is constructed as third interface 35 on the base unit 2 of the air humidifier 1. It is thereby also possible for the fan 23 to be replaced in a simple fashion, if appropriate. It is provided, furthermore, to design the electrodes 10, 11 as ceramic electrodes 36, 37 (see also FIG. 4).

Figure 2:
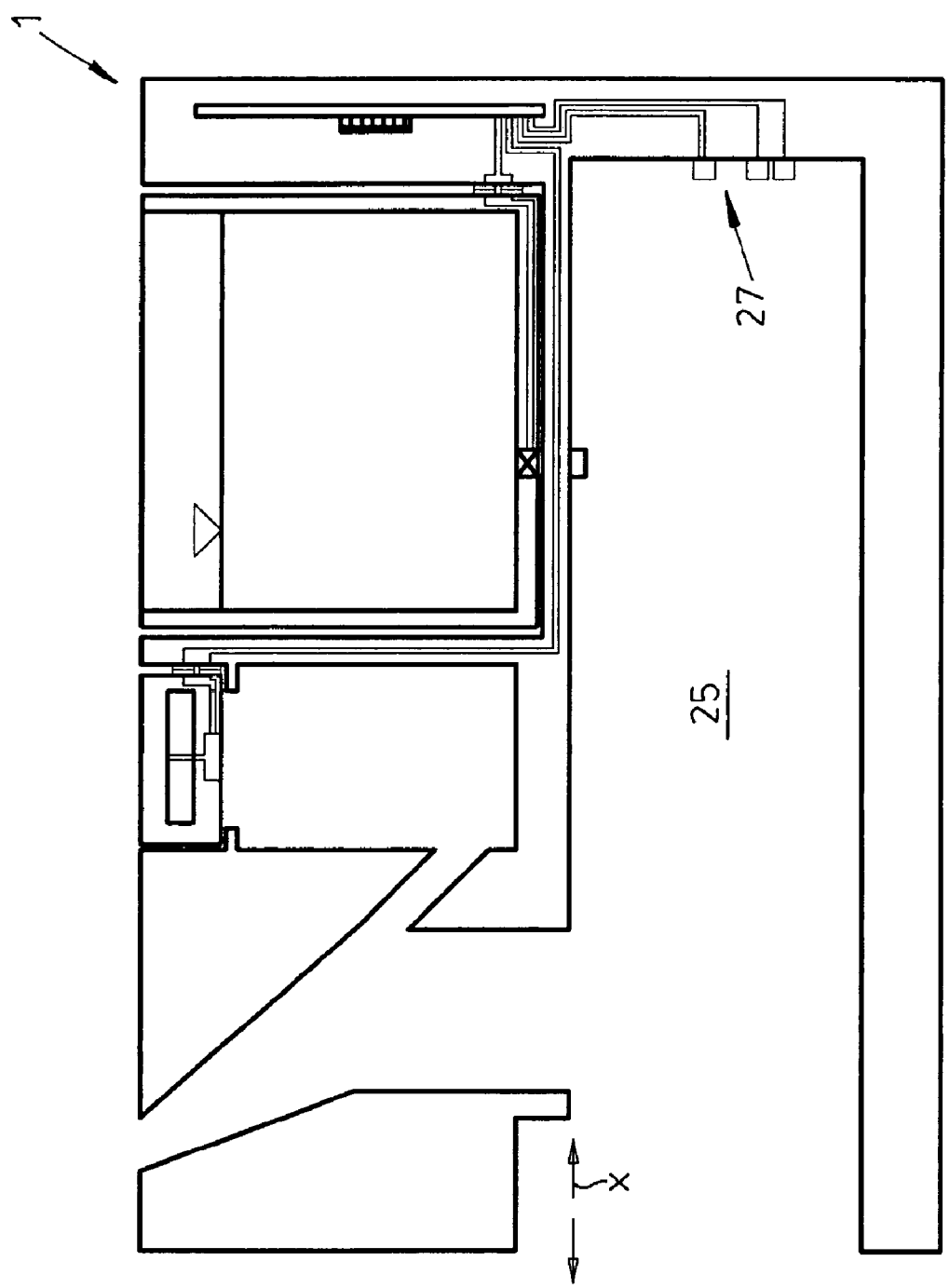
FIG. 2 shows a side view of the air humidifier of FIG. 1, with the replaceable module.

The air humidifier 1 known from FIG. 1 is illustrated in FIG. 2 without the replaceable module. A new replaceable module can now be pushed into the insertion shaft 25 in arrow direction x, and contact can be made with the interface 27.

Figure 3:
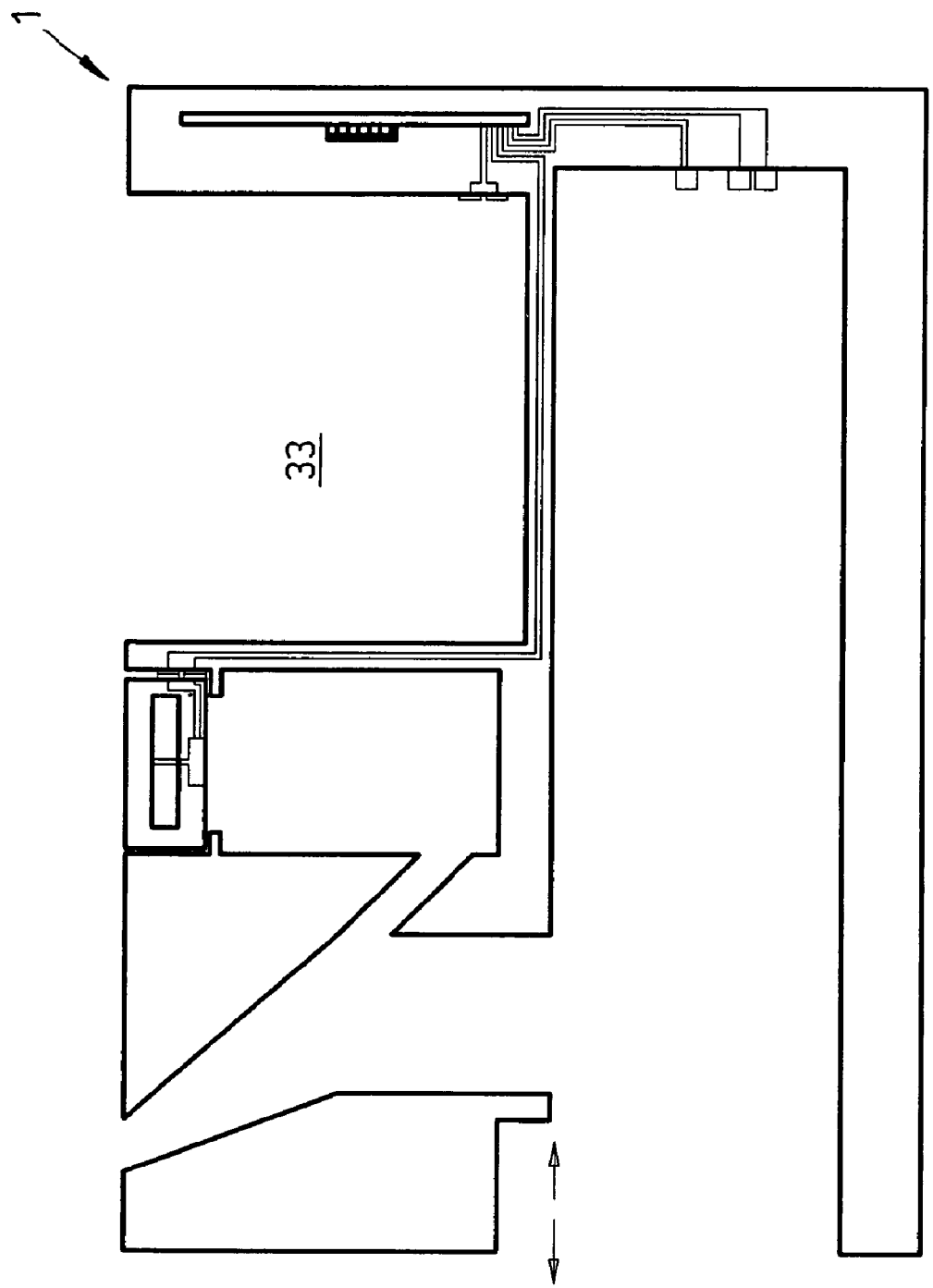
FIG. 3 shows a side view of the air humidifier of FIG. 1, without the replaceable module and without the first container.

FIG. 3 shows once again the air humidifier 1 known from FIG. 1, the first container also being removed from its shaft 33 in addition to the replaceable module.

The replaceable module 3 known from FIG. 1 is illustrated in plan view in FIG. 4. In this view, the two electrodes 10, 11 or 36, 37 can be seen in their arrangement in the first reservoir 6 of the second container 5. It may further be seen how the partition 8 and the filter 9 supported by the latter extend over a width B5 of the second container 5 and divide the latter into the first reservoir 6 and the second reservoir 7.

FIG. 5 shows a side view of the replaceable module 3, such as is already known from FIG. 1, too. It is possible to see in this view individual contacts 38 for the lines L13 of the oscillating plate 14, and individual contacts 39 for the lines L10, L11 to the electrodes. These contacts 38, 39 together form the interface 26 of the module 3.

Figure 6:
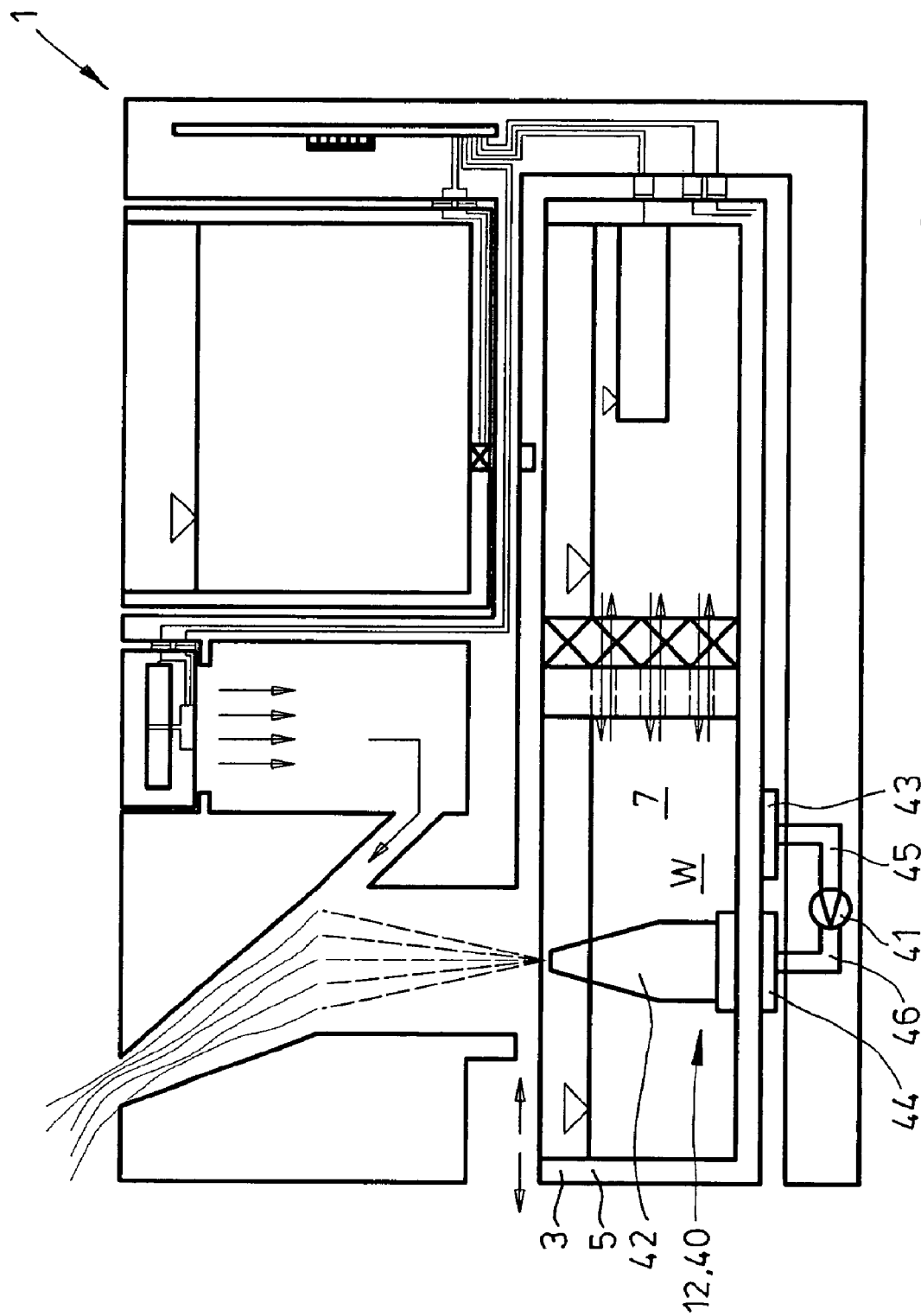
FIG. 6 shows a schematic side view of an air humidifier according to another embodiment of the invention.

A further air humidifier 1 is illustrated in FIG. 6. As opposed to the air humidifier illustrated in FIGS. 1 to 5, said air humidifier 1 has as atomizer 12 a nozzle atomizer 40 that essentially comprises a pump 41 and a nozzle 42. A replaceable module 3 of this air humidifier 1 has two couplings 43, 44. Via the coupling 43, water W can be sucked from a second reservoir 7 of a second container 5 via a pipeline 45 into the pump 41 and be passed on via the latter to the nozzle 42, in order to be atomized, via a second pipeline 46 and the coupling 44. Reference may be made to FIGS. 1 to 5 as regards the functioning of the air humidifier 1, since the air humidifier described there functions identically in principle. When the module 3 is being replaced, the latter is simply picked up from the pipelines 45 and 46 together with the couplings 43 and 44 for the purpose of removal, and subsequently withdrawn.

The invention is not restricted to exemplary embodiments illustrated or described. Rather, it comprises developments of the invention within the scope of the patent claims.

LIST OF REFERENCE SYMBOLS

1 Air humidifier
2 Base unit of 1
3 Replaceable module of 1
4 First container
5 Second container
6 First reservoir of 5
7 Second reservoir of 5
8 Partition between 6 and 7
9 Filter between 6 and 7
10 Electrode
11 Electrode
12 Atomizer
13 Ultrasonic atomizer
14 Oscillating plate
15 Piezoceramic plate
16 Electronic system for 14
17 Component of the atomizer 12, 13
18 Outflow duct
19 Air flow
20 Fan
21 Blower duct
22 Control electronics
23 Valve on 4
24 Outlet of 4
25 Insertion shaft for 3
26 Interface on 3
27 First interface on 2
28 Interface on 4
29 Second interface on 2
30 Water level in 5
31 Sensor
32 Duct in 8
33 Shaft for 4 in 2
34 Interface on 23
35 Third interface on 2
36 Ceramic electrode
37 Ceramic electrode
38 Electrical contact on 3 for L13
39 Electrical contact on 3 for L10 or L11
40 Nozzle atomizer
41 Pump of 40
42 Nozzle of 40
43 Coupling
44 Coupling
45 Pipeline
46 Pipeline
B5 Width of 5
K Water cone
L10 Line from 10 to 22
L11 Line from 11 to 22
L13 Line from 13 to 22
L23 Line from 23 to 22
N Level of 30
X19 Flow direction of 19
x Arrow direction
x' Arrow direction

What is claimed:

1. An air humidifier comprising a first container and a second container that can be filled with water from the first container, an atomizer and electrodes, the second container being subdivided into a first reservoir and a second reservoir, the two reservoirs being interconnected through an interposed filter, two electrodes arranged in the first reservoir, and a component of an atomizer arranged in the second reservoir in order to atomize the water.

2. The air humidifier as claimed in claim 1, wherein the air humidifier can be separated into a base unit and at least one replaceable module.

3. The air humidifier as claimed in claim 2, wherein the replaceable module comprises at least one of the electrodes, the filter and the component of the atomizer.

4. The air humidifier as claimed in claim 2, wherein the replaceable module is received in the base unit in a removeable manner.

5. The air humidifier as claimed in claim 2, wherein the replaceable module houses the second container.

6. The air humidifier as claimed in claim 1, wherein the electrodes are ceramic electrodes.

7. The air humidifier as claimed in claim 1, wherein the filter is a mechanical filter.

8. The air humidifier as claimed in claim 1, further comprising a sensor arranged in the second container.

9. The air humidifier as claimed in claim 8, wherein the sensor detects a water level in the second container.

10. The air humidifier as claimed in claim 8, wherein the sensor is formed by the two electrodes.

11. The air humidifier as claimed in claim 8, wherein the sensor determines the quality of the water in the second container.

12. The air humidifier as claimed in claim 2, wherein the replaceable module has an interface with control electronics.

13. The air humidifier as claimed in claim 1, wherein the atomizer is an ultrasonic atomizer comprising an electronic system and an oscillating plate, the electronic system and the oscillating plate being physically separated from one another, and the oscillating plate being arranged in the second reservoir as the component of the atomizer.

14. The air humidifier as claimed in claim 13, wherein the oscillating plate is a piezoceramic plate.

15. The air humidifier as claimed in claim 13, wherein the replaceable module has an interface with control electronics and the interface has electrical contacts for the oscillating plate.

16. The air humidifier as claimed in claim 1, wherein the atomizer is a nozzle atomizer comprising a pump and a nozzle, the nozzle being arranged in the second reservoir as a component of the atomizer.

17. The air humidifier as claimed in claim 1, wherein the electrodes operate in a standby mode in which the atomizer is not active.

18. The air humidifier as claimed in claim 5, further comprising a sensor arranged in the second container.

* * * * *